Oct. 19, 1954
P. LETRILLIART
2,692,365
FREQUENCY AND PHASE CONVERTER GROUP
Filed Nov. 2, 1951
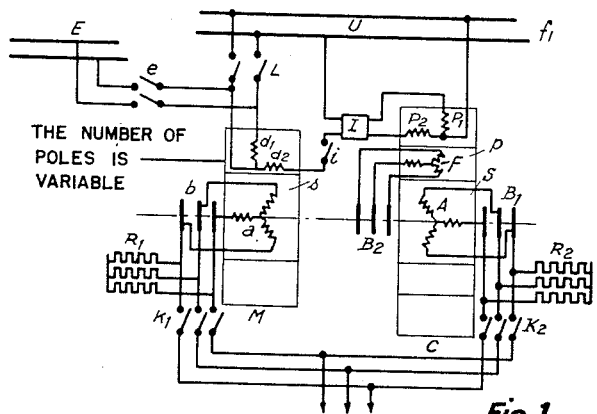
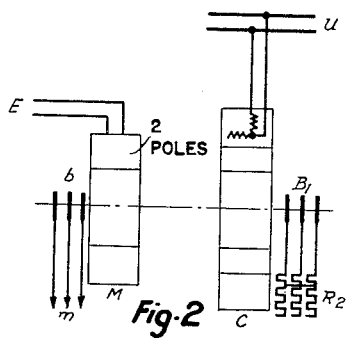
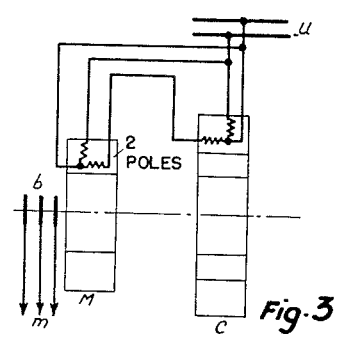
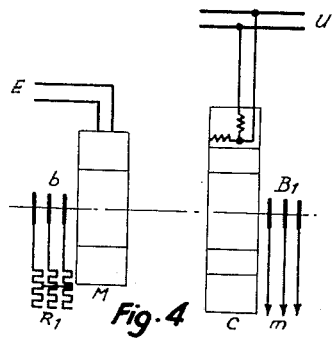
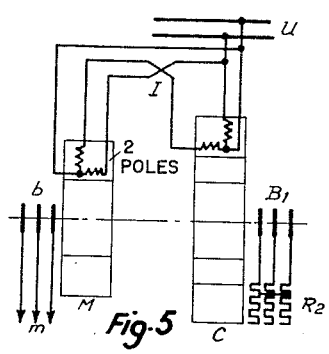
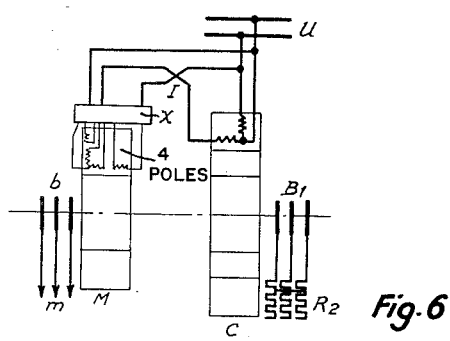
INVENTOR
Pierre Letrilliart
By Shoemaker & Mattare
ATTORNEYS Patented Oct. 19, 1954

2,692,365

UNITED STATES PATENT OFFICE 2,692,365

FREQUENCY AND PHASE CONVERTER GROUP

Pierre Letrilliart, Jeumont, Nord, France, assignor to Forges et Ateliers de Constructions Electriques de Jeumont, Paris, France, a French body corporate Application November 2, 1951, Serial No. 254,600

Claims priority, application France November 23, 1950

10 Claims. (Cl. 321—7)

The present invention relates to frequency convertor groups such as described in the United States Patent No. 2,585,392, dated February 12, 1952.

The invention has for its main object to provide improved means for the regulation of such convertor groups with a view to obtaining, from a single-phase supply system, a variable frequency output for feeding a three-phase load circuit, which may comprise, for example asynchronous traction motors with squirrel-cage rotors.

A further object of the invention is to provide a series of interconnections with a view to producing different values of the output frequency of such a group, for example a progressively increasing frequency for acceleration of load motors.

The invention has likewise for an object to provide an arrangement consisting of simple apparatus easy to control.

According to the invention, a convertor group of the class described in the aforesaid patent and formed by a first machine having a stator of variable pole-number and an induction-type slip-ring rotor, coupled to a second machine having a stator partly energized by single-phase current, a main slip-ring rotor and an intermediate synchronous rotor, is provided with two adjustable starting and slip rheostats, each connected to one of the slip-ring rotors, as well as two switches arranged for connecting each of these slip-ring rotors to the load circuit, a switch arranged for connecting the stators of the two machines partly together, and switches for energizing the stator of the first machine with single-phase current and with direct current respectively, causing it to operate in the one case as synchronous generator and in the other case as a frequency changer.

The invention is hereinafter more fully described with reference to the accompanying drawing, in which:

Fig. 1 is a diagram of the improved convertor group.

Figs. 2 to 6 show several different interconnections of the group for supplying a range of desired output frequencies to the load circuit.

The convertor group illustrated in Fig. 1 like that of the aforesaid patent, comprises two machines, the first asynchronous machine M having a stator carrying for instance a two-phase winding $d_1$, $d_2$ and a rotor $s$ carrying a three-phase winding $a$, connected to the slip-rings $b$. The second machine C, mechanically coupled to the first, comprises a stator with for instance a two-phase winding $P_1$, $P_2$, a main rotor S with a three-phase winding A connected to the slip-rings $B_1$, and an intermediate synchronous rotor $p$, rotating freely and carrying a three-phase field winding $f$ connected to the slip rings $B_2$. As stated in the aforesaid patent, the intermediate rotor $p$ can perform the offices of exciter and damper for the inverse field, and produce an adjustable regular rotating field.

The rotor slip rings $b$ and $B_1$ are respectively connected to an adjustable starting rheostat $R_1$ and to an adjustable slip rheostat $R_2$. Moreover, they can be connected to the load $m$ by means of the switches $K_1$ and $K_2$ respectively.

One stator phase winding $d_1$ of the first machine M can be energized by means of a switch L from a single-phase line U of frequency $f_1$; a switch $e$ allows of energizing this same phase winding from a direct current line E. The other phase winding $d_2$ can be connected by a switch $i$ with one stator phase winding $P_2$ of the machine C. The phase winding $P_1$ of this machine is connected to the line U. A reversing switch I can be arranged to change the direction of rotation of the phases $P_1$ and $P_2$ in relation to the line U and the stator windings of the machine M.

It will be assumed for example that the frequency $f_1$ is 50 cycles per second, that the machine M comprises a pole-changing switch X (as shown in Fig. 6) whereby its stator may operate with two poles or with four poles, and that the stator of the machine C is wound to have four poles. The connections of the pole-changing switch may be as described and shown in the aforesaid patent.

The group thus formed is utilized in the following manner: First of all, the switches $e$ and $K_1$ are closed to obtain the connections shown in Fig. 2; the machine M is energized with direct current from the source E, and its slip-rings $b$ are connected to the load $m$.

The machine C is started by means of its rheostat $R_2$, and drives the machine M which operates as a two-pole synchronous generator. As the group accelerates to reach the speed of 1500 revolutions per minute, the polyphase output frequency furnished to the load $m$ at the rings $b$ of the machine M increases and gradually reaches 25 cycles per second; that value (equal to 50% of the supply frequency $f_1$) corresponds to the first speed of the load motors, if the load $m$ is formed by such motors.

It is likewise possible to start the machine C idly and to obtain the same output frequency by the interconnection shown in Fig. 3, where the stator of the machine M is energized with three-phase current by closing the switches $i$ and L. If this machine is started with four poles, its field will rotate at 1500 revolutions per minute in synchronism with its rotor, which is driven at that same speed by the machine C, so that the frequency at the rings $b$, still connected to the load $m$, is nil. The stator of the machine M is then changed to two-pole connection, which doubles the speed of its rotating field; the slip becomes equal to 1500 revolutions per minute, and with the two-pole connection, there is obtained at the rings $b$ a frequency of 25 cycles per second.

It is to be noted that the interconnection according to Fig. 2 gives a higher efficiency than that of Fig. 3; it also allows ready adjustment of the output voltage by variation of the direct current supplied to the stator of the machine M.

According to Fig. 4, the machine M is again connected to be energized with direct current from the source E, but the rings $B_1$ of the machine C are connected to the load $m$ by the switch $K_2$; the rheostat $R_1$ of the machine M is progressively short-circuited and the group is thus practically brought to rest. The machine C then operates as a static transformer and supplies to the load $m$ a three-phase current at 50 cycles per second, which corresponds to the second speed of the load motors. In order to reduce losses, the load $m$ can then be connected directly across the stator windings of the machine C.

The next interconnection is represented in Fig. 5 which is analogous to Fig. 3. In this case, however, the connections between the stators of the machines C and M are crossed, as compared with those of Fig. 3, by means of the reversing switch I. The group is restarted in the same direction as in Fig. 3 by means of the rheostat $R_2$. The machine M is connected to have two poles, so that its field rotates at 3000 revolutions per minute and in the opposite direction to that of its rotor $s$ which is driven by the machine C at 1500 revolutions per minute in the original direction; the relative speed of the rotor of the machine M is therefore 4500 revolutions per minute, which, with the two-pole machine now operating as frequency changer, produces at its rings $b$ a frequency of 75 cycles per second; this corresponds to the third speed of the load motors.

Lastly, as shown in Fig. 6, the interconnection is identical with that of Fig. 5, except that by the action of the pole-changing switch the stator of the machine M is now connected so as to have four poles. Its field therefore rotates at 1500 revolutions per minute, in the opposite direction to that of its rotor, which is driven by the machine C at 1500 revolutions per minute in the original direction. The slip speed in the machine M operating as frequency changer is therefore 3000 revolutions per minute, and with four poles there appears at its rings $b$ a frequency of 100 cycles per second; this frequency corresponds to the fourth speed of the load motors.

In the arrangement and with the interconnections described, the group always revolves in the same direction but it stops in order to give the second speed of the load motors.

It is possible to extend and to modify the range of speeds obtained, by providing likewise for changing the number of poles on the machine C, or by interposing between the machines M and C a mechanical transmission of variable ratio, or again by changing the number of poles on the load motors.

What I claim is:

1. In a convertor group connected to feed a polyphase load circuit at a variable frequency from a single-phase supply system, and formed by a first machine having a stator winding of variable pole-number comprising a plurality of interconnected and inductively coupled portions, one of said portions being connected to said single-phase supply system, and a rotor with phase windings and main slip-rings, and a second machine having a stator winding comprising a plurality of interconnected and inductively coupled portions, one of said portions being connected to said single-phase supply system, a main rotor with phase windings and main slip-rings and a freely rotating intermediate rotor with a plurality of field windings connected to three field slip-rings, a combination of control means for modifying the output frequency of said group, comprising a direct-current source, a direct-current switch connected between said source and the portion of the stator winding of said first machine connected to said supply system, an alternating-current switch arranged to control the supply from said single-phase supply system to said last-mentioned portion, an interconnecting switch connected for coupling together the remaining portions of the stator windings of both said machines not connected to said single-phase supply system, means for reversing the field rotation of said second machine, a first adjustable rheostat connected to the main slip-rings of said first machine, a second adjustable rheostat connected to the main slip-rings of said second machine, and load-switching means connected for coupling said load circuit to the main slip-rings of either of said first and second machines.

2. In a convertor group connected between a single-phase supply system and a polyphase load circuit, and formed by a first machine having a stator winding with variable pole-number, said stator winding comprising a plurality of interconnected and inductively coupled portions, one of said portions being connected to said single-phase supply system, and an induction-type rotor with phase windings and a group of main slip-rings, a second machine mechanically connected to said first machine, said second machine having a stator winding with a plurality of interconnected and inductively coupled portions, one of said portions being energized by said supply system, a main rotor with phase windings and a group of main slip-rings and a freely rotating intermediate synchronous rotor with field windings and three field slip-rings connected thereto, control means for modifying the frequency of the polyphase current delivered by said group to said load circuit, said control means comprising a first adjustable rheostat connected to said main slip rings of the first machine, a second adjustable rheostat connected to said main slip-rings of the second machine, load switching means connected between each of said two groups of main slip-rings and said load circuit, an interconnecting switch connected between the remaining portions of the stator windings of said two machines which are not energized by said supply system, a direct current source, means for reversing the field rotation of said second machine, a direct current switch connected for energizing from said direct-current source the portion of the stator winding of said first machine connected to said single-phase supply system, and an alternating current switch connected to control the single-phase energization of said first machine.

3. In a convertor group including the elements and control means specified in claim 1, an interconnection of said elements and control means for producing the lowest polyphase output frequency, comprising said direct current switch in its closed position, with the coupling for the lowest number of poles upon the stator of said first machine, the interconnection of the rotor slip-rings of said first machine with the load circuit by said load switching means, and said second rheostat in a short-circuit position, whereby said second machine is connected and energized as an induction motor with said intermediate rotor rotating at synchronous speed.

4. In a convertor group including the elements and control means specified in claim 1, an interconnection of said elements and control means for producing a low polyphase output frequency, comprising said interconnecting switch and said alternating current switch in closed position, whereby the stator windings of said two machines are connected in parallel with the coupling for the lowest number of poles upon the stator of said first machine, its rotor slip-rings being connected by said load switching means to the load circuit and said second rheostat being in a short-circuit position, whereby said second machine is energized as an induction motor.

5. In a convertor group including the elements and control means specified in claim 1, an interconnection of said elements and control means for producing a polyphase output frequency approximately equal to that of the single-phase supply system, comprising said direct current switch in the closed position and said first rheostat in a short-circuit position, whereby said first machine is connected as a short-circuited and practically immobilized synchronous generator, the main rotor slip-rings of said second machine being connected to the load circuit by said load switching means.

6. In a convertor group including the elements and control means specified in claim 1, an interconnection of said elements and control means for producing a polyphase output frequency higher than that of the single-phase supply system, comprising said interconnecting switch and said alternating current switch in the closed position for connecting the stator winding of said two machines in parallel, with their respective fields rotating in opposite directions, with the coupling for the lowest number of poles upon the stator of said first machine, its rotor slip-rings being connected to the load circuit by said load switching means, and said second rheostat being in a short-circuit position, whereby said second machine is connected as an asychronous motor.

7. In a convertor group including the elements and control means specified in claim 1, an interconnection of said elements and control means for producing a polyphase output frequency much higher than that of the single-phase supply system, comprising said interconnecting switch and said alternating current switch in the closed position for connecting the stator windings of said two machines in parallel, with their respective fields rotating in opposite directions, the coupling for an increased number of poles upon the stator of said first machine, its rotor slip-rings being connected to the load circuit by said load switching means, and said second rheostat being in a short-circuited position, whereby said second mamine is connected as an asychronous motor.

8. In a convertor group including the elements and control means specified in claim 1, an interconnection of said elements and control means for producing a low frequency of the polyphase output, said direct current switch being closed to energize the stator windings of said first machine coupled for the lowest number of poles, said load switching means connecting the rotor slip-rings of said first machine to the load circuit, and said second rheostat being in a short-circuit position, whereby said second machine is energized as an induction motor with said intermediate rotor rotating at synchronous speed.

9. In a convertor group including the elements and control means specified in claim 1, an interconnection of said elements and control means for producing a polyphase output frequency approximately equal to that of the single-phase supply system, said direct current switch being closed to erergize the stator windings of said first machine, said load switching means connecting the main rotor slip-rings of said second machine to the load circuit, and said first rheostat being in a short-circuit position, whereby said machines are practically immobilized with said second machine operating as a static transformer.

10. In a convertor group including the elements and control means specified in claim 1, an interconnection of said elements and control means for producing a polyphase output frequency higher than that of the single-phase supply system, said interconnecting switch and said alternating current switch being closed for connecting the stator windings of said two machines in parallel, with their fields rotating in opposite directions, and said load switching means connecting the rotor slip-rings of said first machine to the load circuit, and said second rheostat being in a short-circuit position, whereby said first machine operates as frequency changer.

References Cited in the file of this patent

UNITED STATES PATENTS

| Number | Name | Date |
| --- | --- | --- |
| 615,673 | Bradley | Dec. 13, 1898 |
| 2,061,983 | Rossman | Nov. 24, 1936 |
| 2,306,225 | Robinson | Dec. 22, 1942 |
| 2,585,293 | Letrilliart | Feb. 12, 1952 |